Feb. 16, 1926.

J. P. ALDRICH ET AL

STACKING MACHINE

Filed Jan. 9, 1925

1,573,024

15 Sheets-Sheet 2

Inventors
John P. Aldrich.
Howard A. Morris.

By Owen, Owen & Crampton,

Attorneys

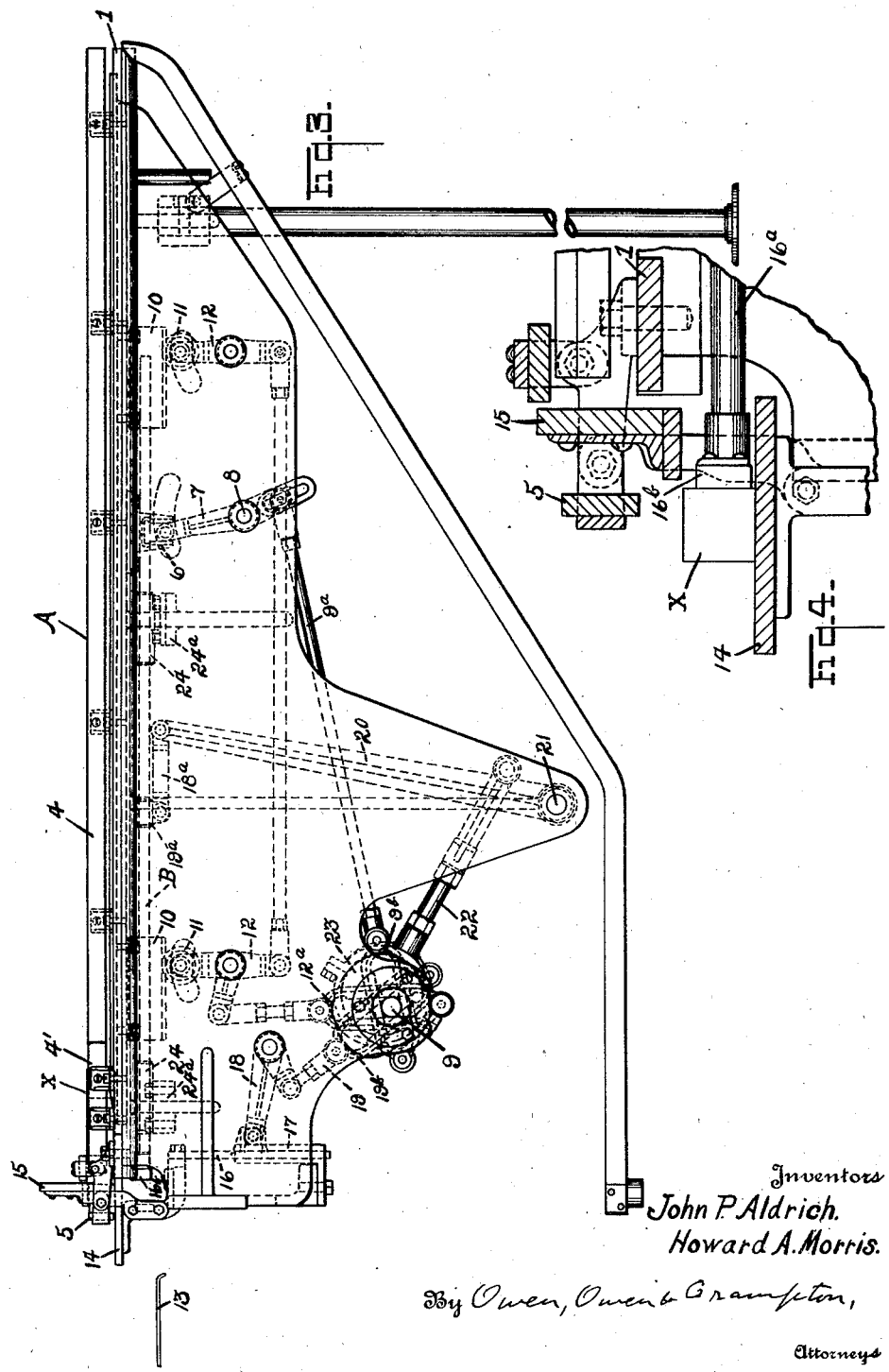

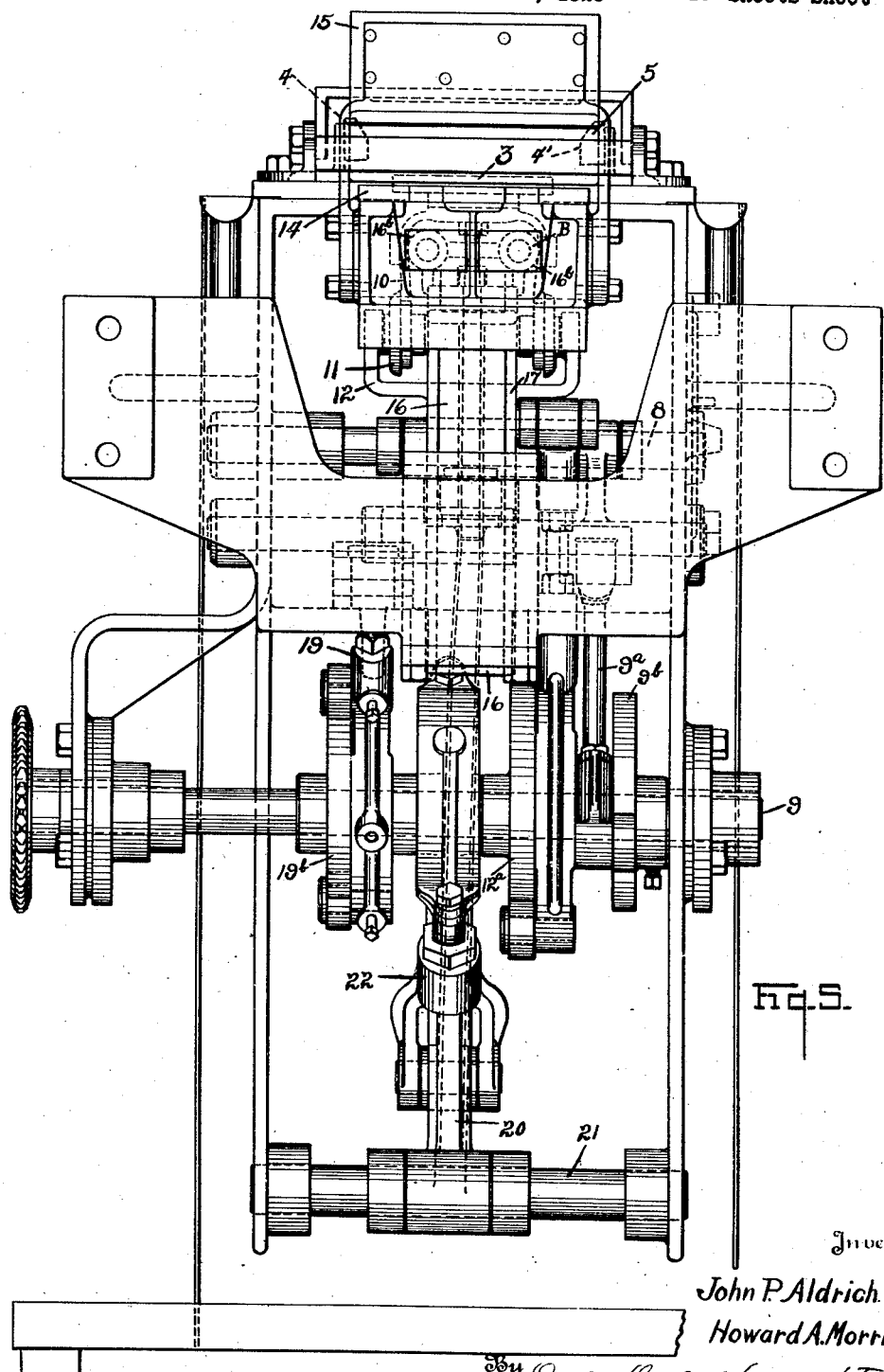

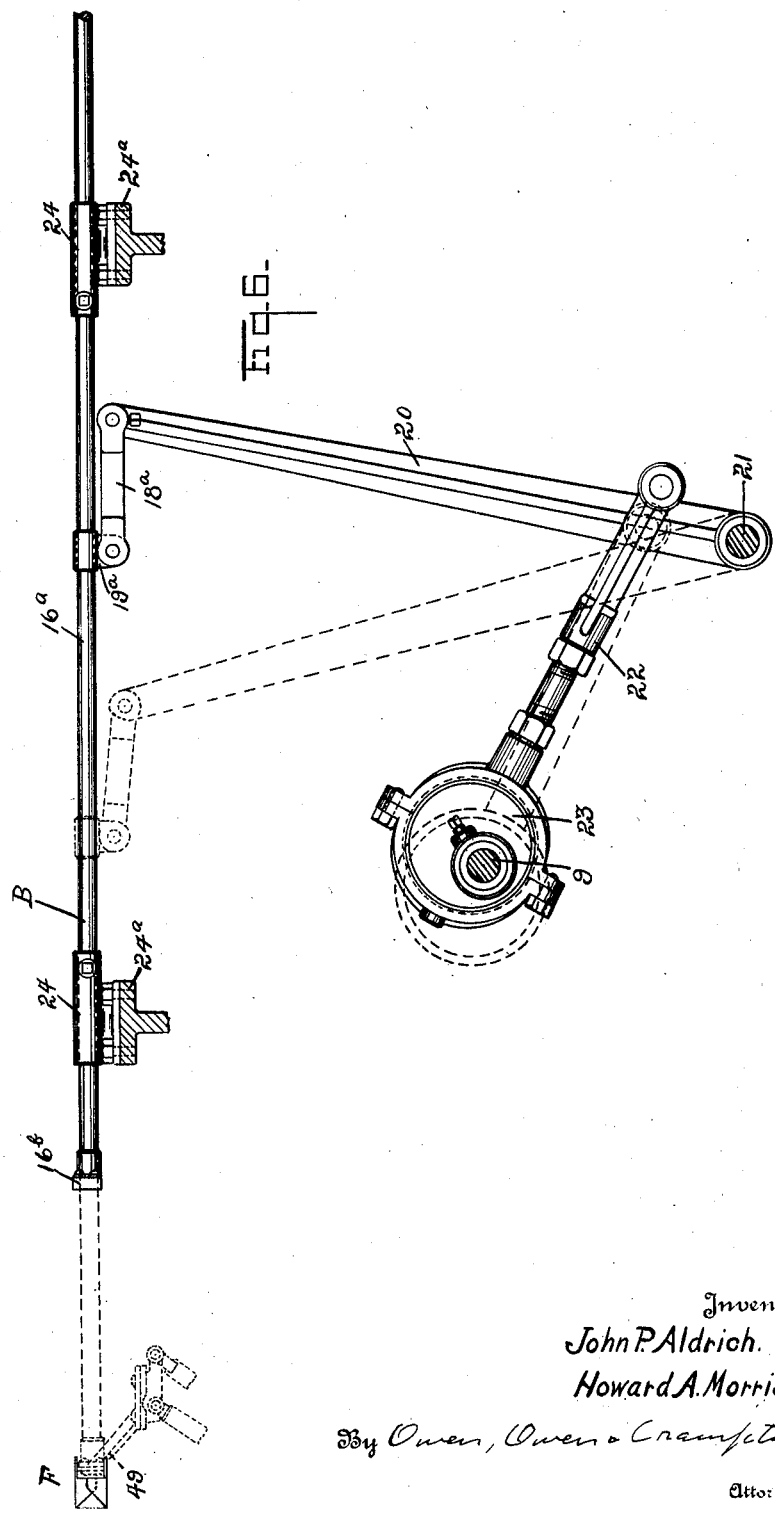

Feb. 16, 1926. 1,573,024
J. P. ALDRICH ET AL
STACKING MACHINE
Filed Jan. 9, 1925 15 Sheets-Sheet 6
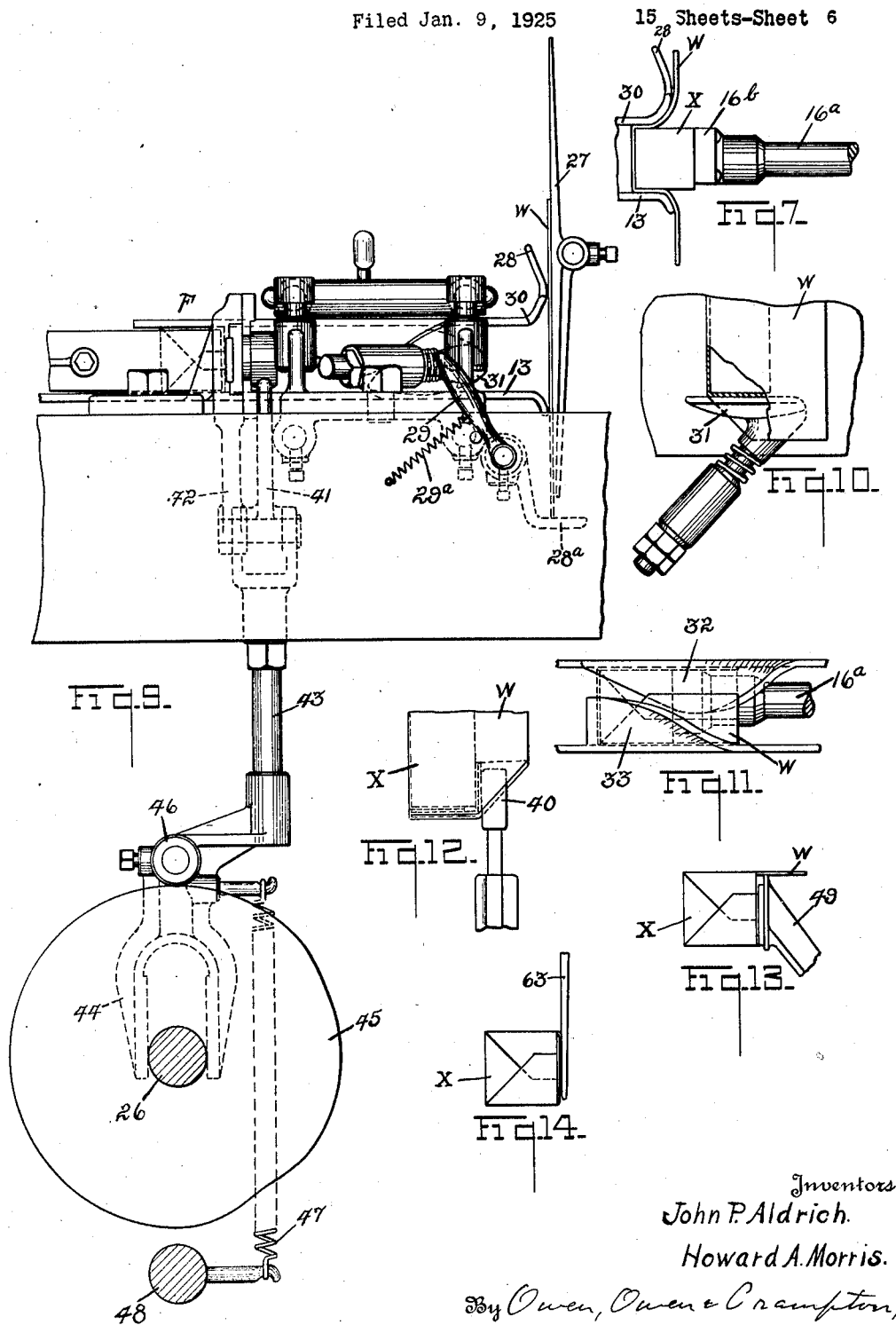
Inventors
John P. Aldrich.
Howard A. Morris.
By Owen, Owen & Crampton,
Attorneys

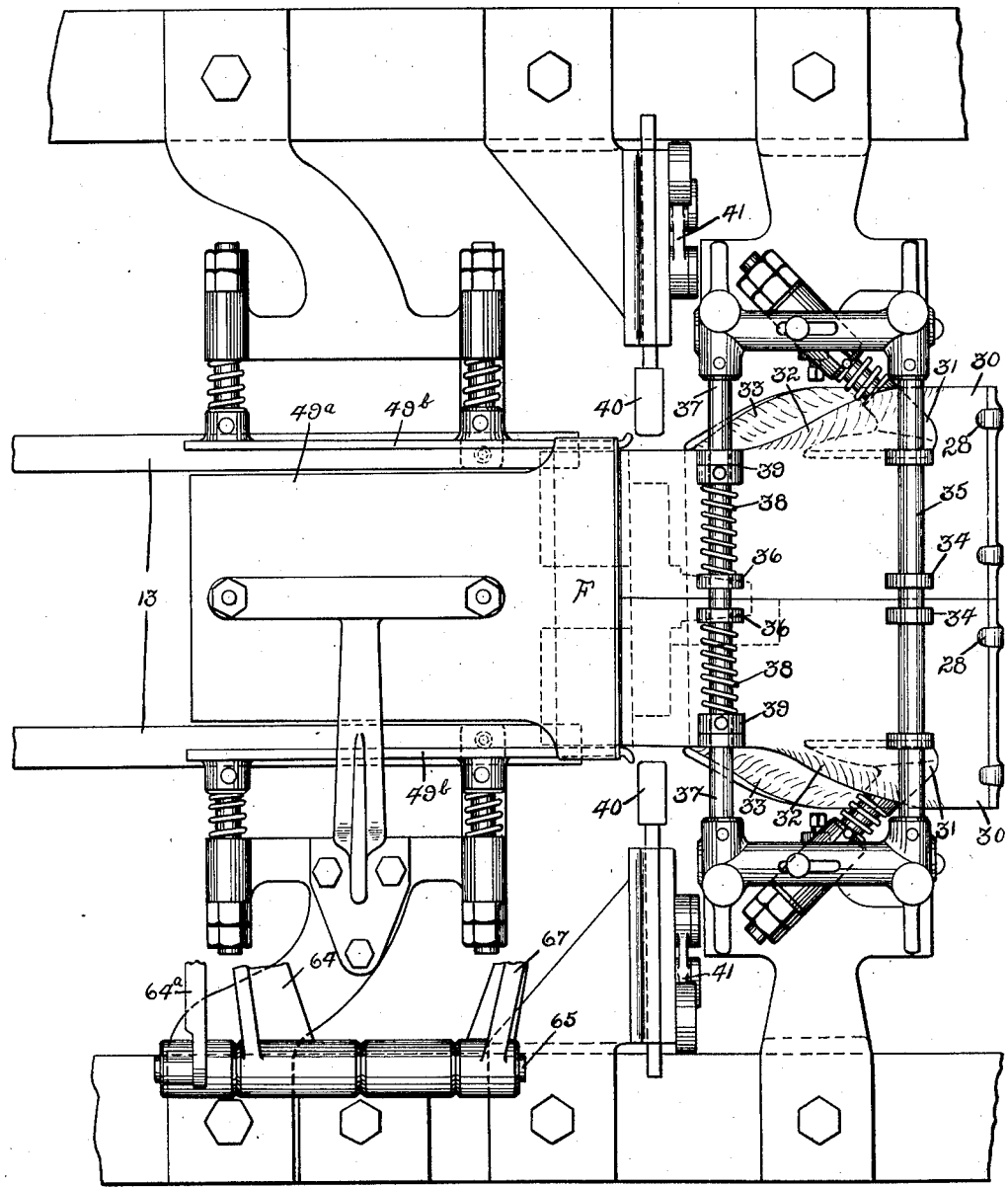

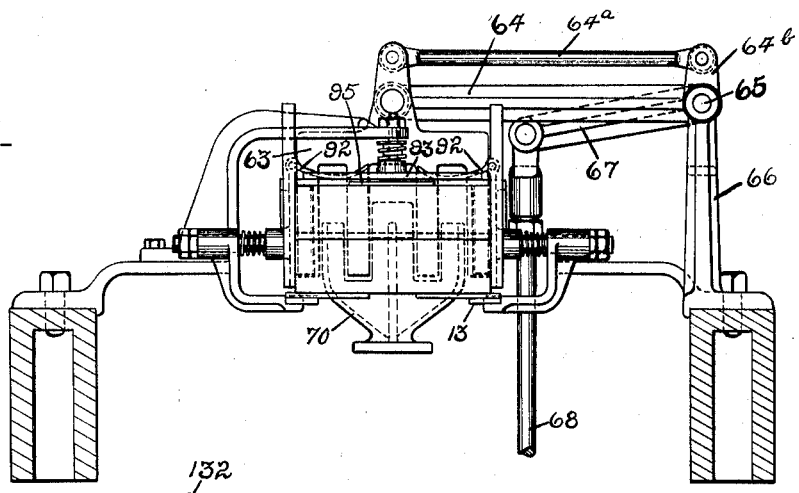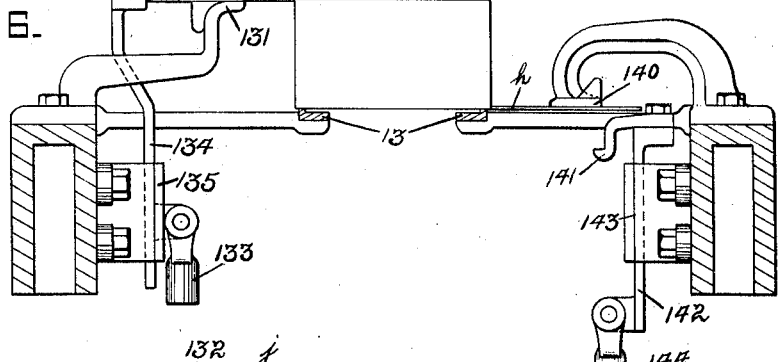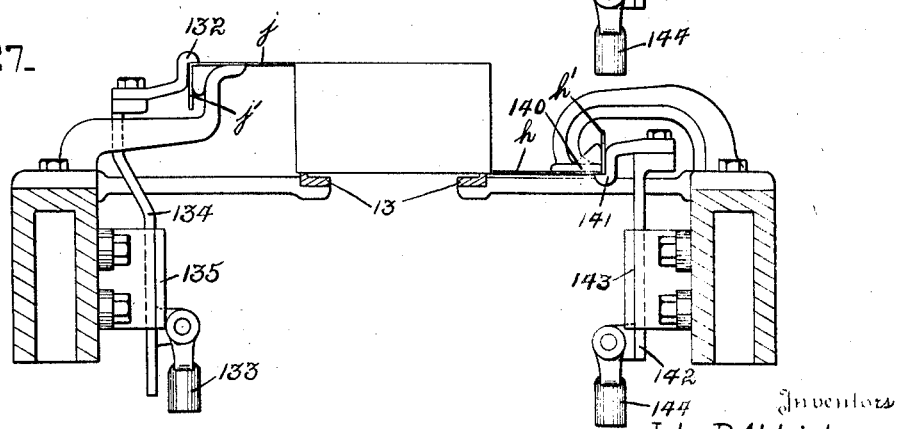

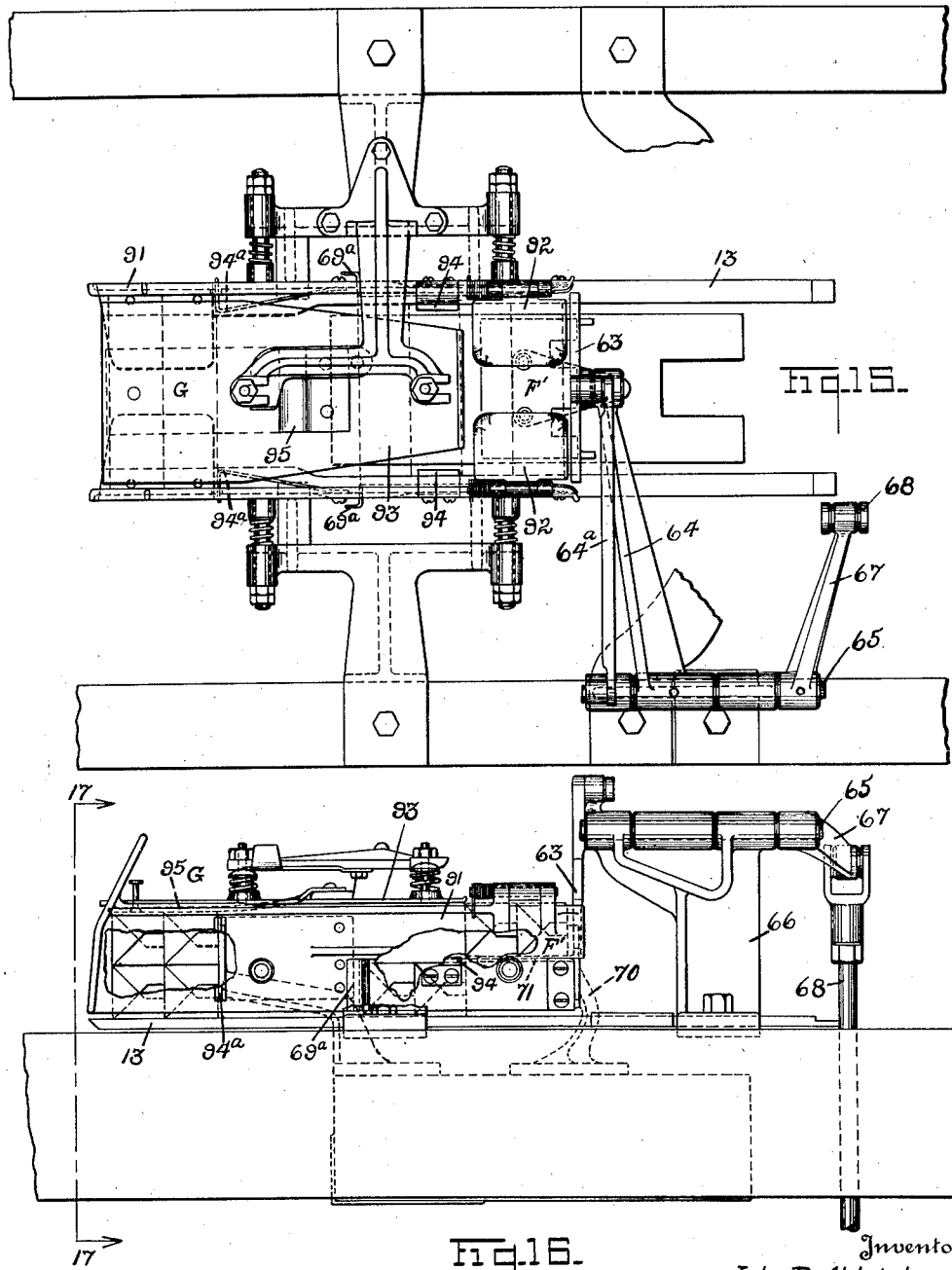

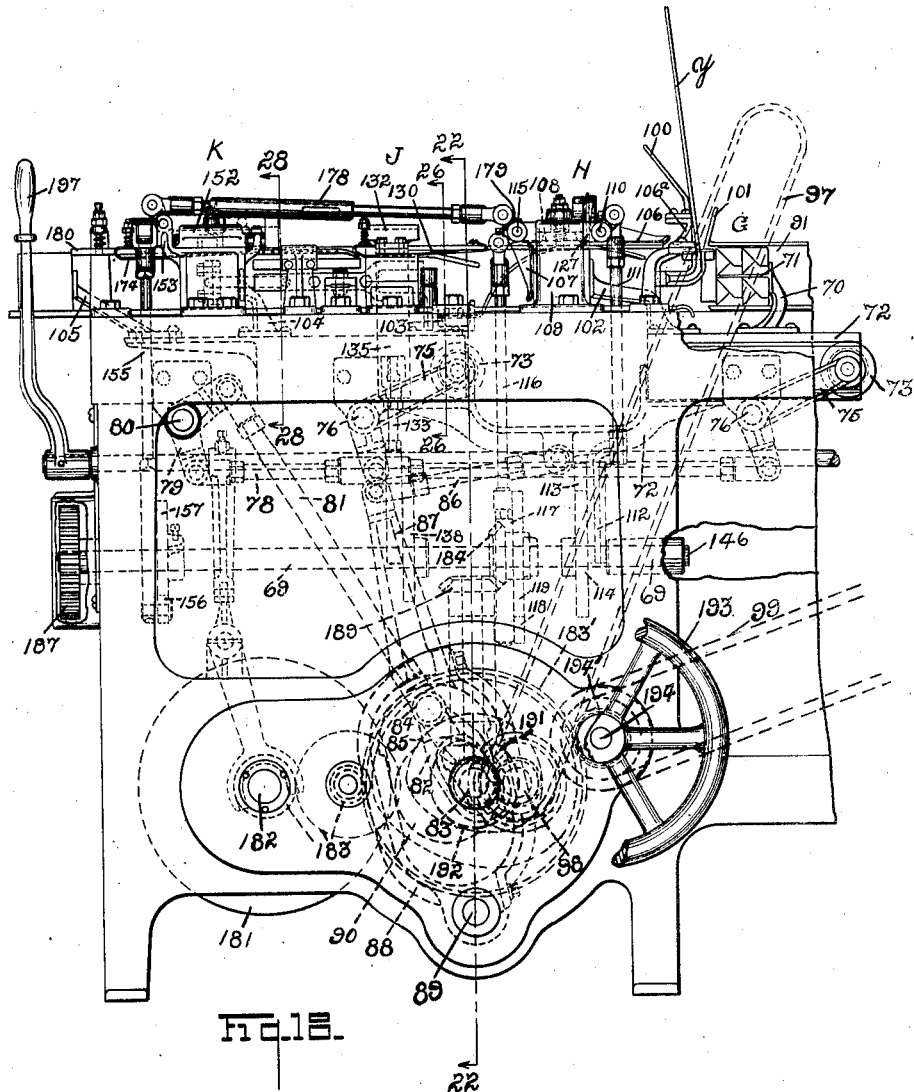

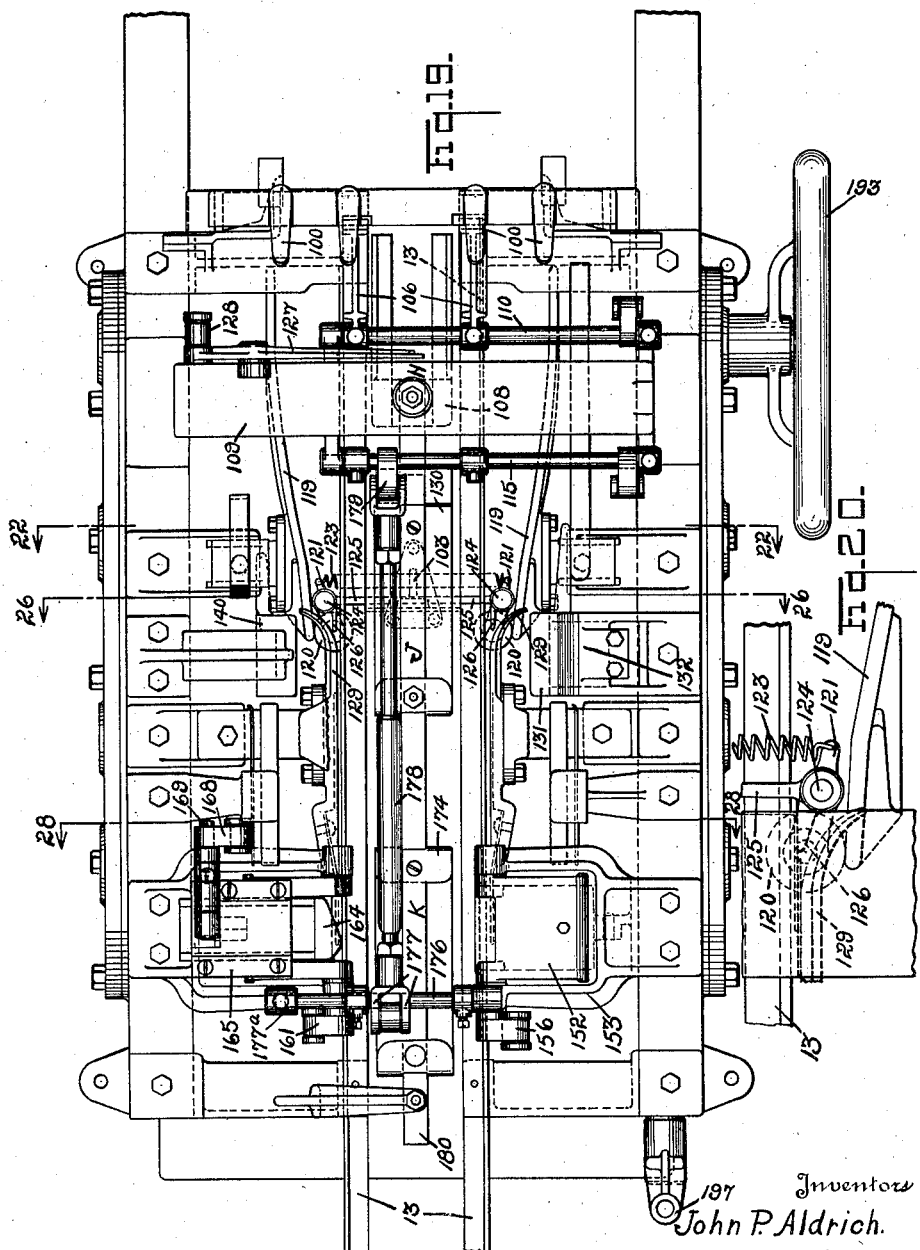

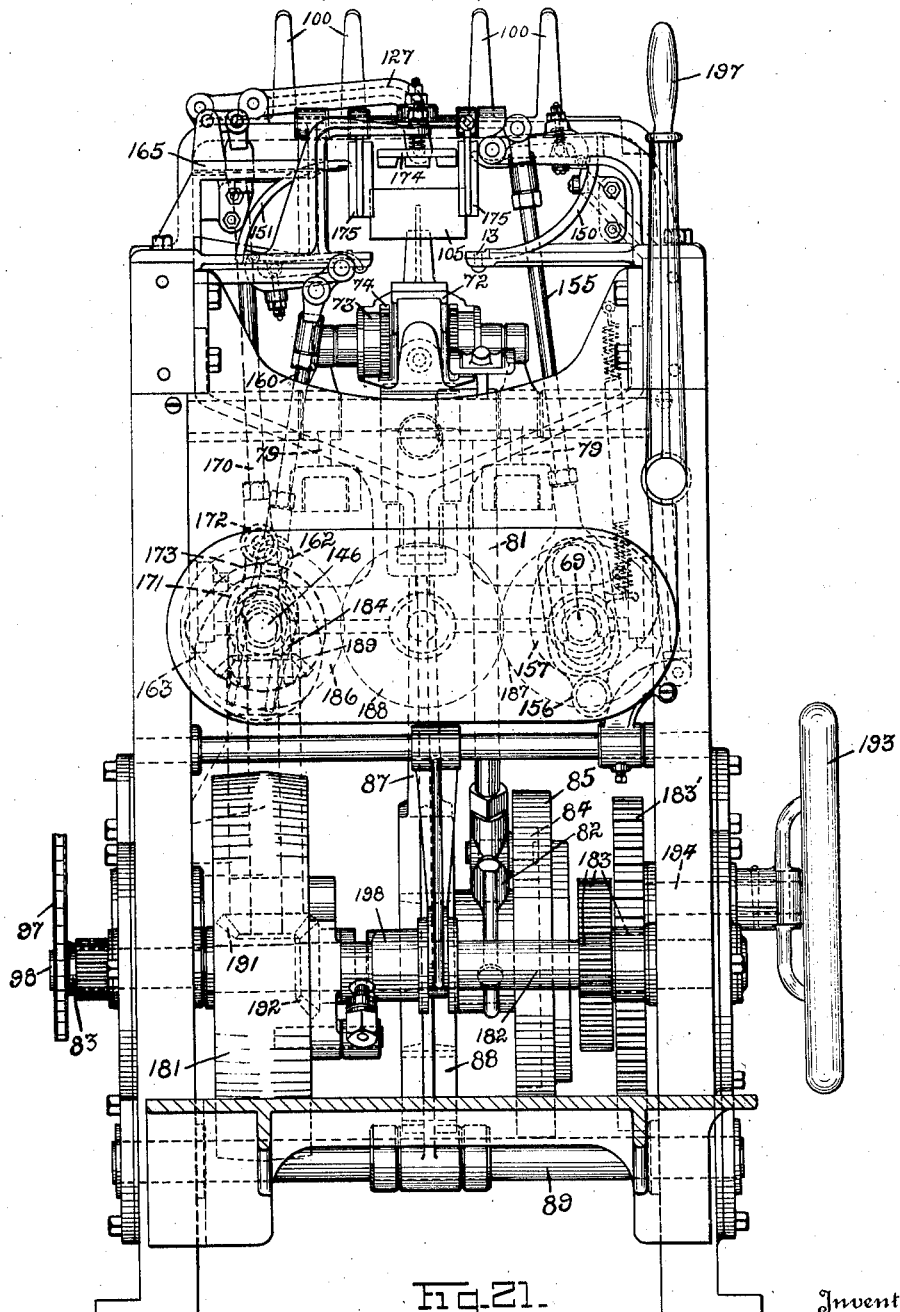

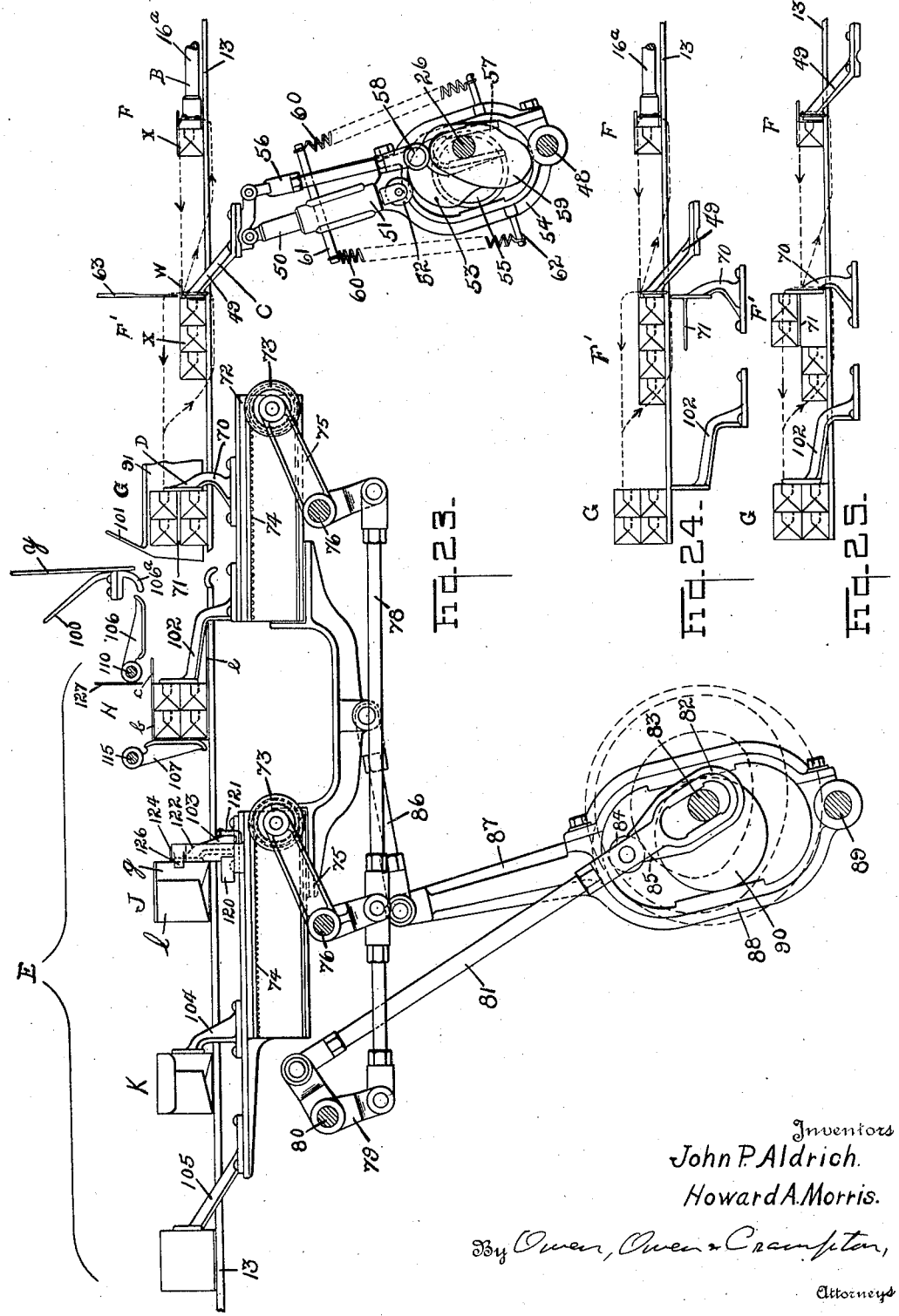

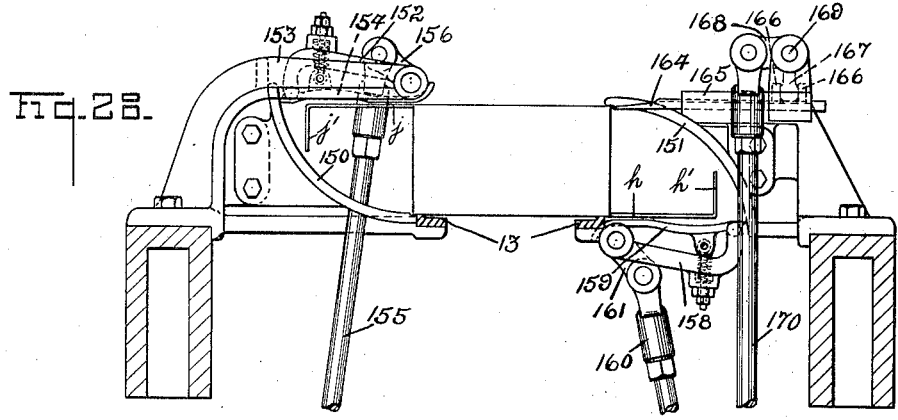
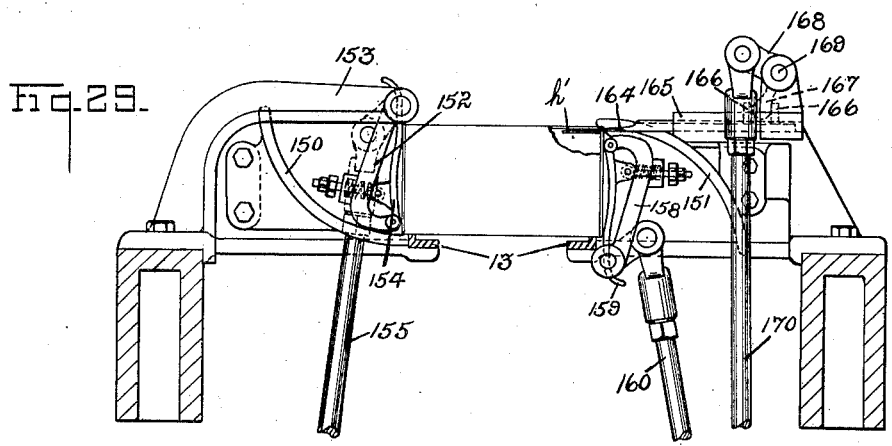
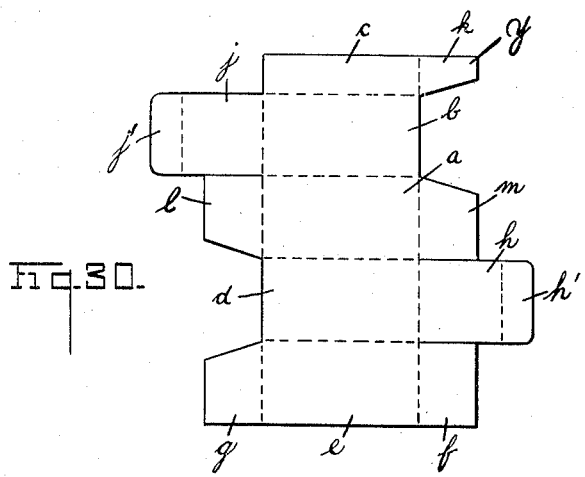

Patented Feb. 16, 1926.

1,573,024

UNITED STATES PATENT OFFICE.

JOHN P. ALDRICH AND HOWARD A. MORRIS, OF TOLEDO, OHIO, ASSIGNORS TO THE AUTOMAT MOLDING & FOLDING MACHINE COMPANY, OF TOLEDO, OHIO, A CORPORATION OF OHIO.

STACKING MACHINE.

Application filed January 9, 1925. Serial No. 1,352.

*To all whom it may concern:*

Be it known that we, JOHN P. ALDRICH and HOWARD A. MORRIS, citizens of the United States, and residents of Toledo, in the county of Lucas and State of Ohio, have invented a new and useful Stacking Machine, which invention is fully set forth in the following specification.

This invention relates to machines for wrapping articles, and particularly to machines for individually wrapping one-quarter pound units of butter, oleomargarine and the like and packaging a number of such units in a single carbon.

Objects of the invention are to provide a machine of the above type for wrapping an article, such as a one-quarter pound unit or bar of butter, which eliminates liability of distorting the shape of such unit while being wrapper; to provide in a machine of this type novel means for stacking a predetermined number of articles to form a pile having substantially symmetrical sides; to provide novel means for packaging a stack of individual articles; to provide a new and improved machine which is adapted successively to wrap bars of butter and the l'ke, to form a stack containing a predetermined number of such wrapped bars, and to enclose the stack in a carton so that as delivered from the machine a unitary package is produced containing a predetermined number of wrapped bars; and, in general, to provide a package wrapping machine having the new and improved features of construction, arrangement and operation hereinafter described.

The invention is shown by way of illustration in the accompanying drawings, in which,—

Figure 1:
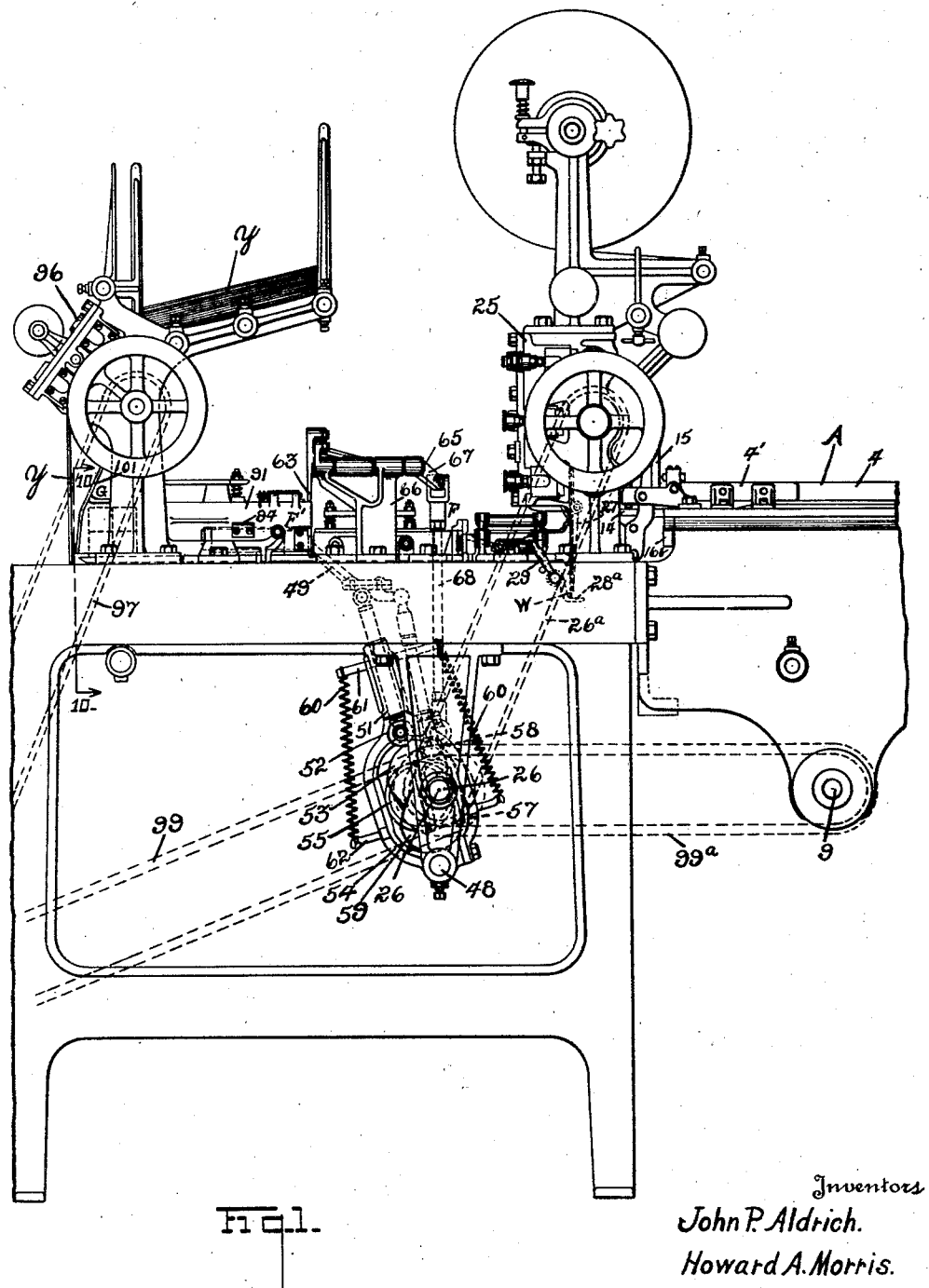
Figure 2:
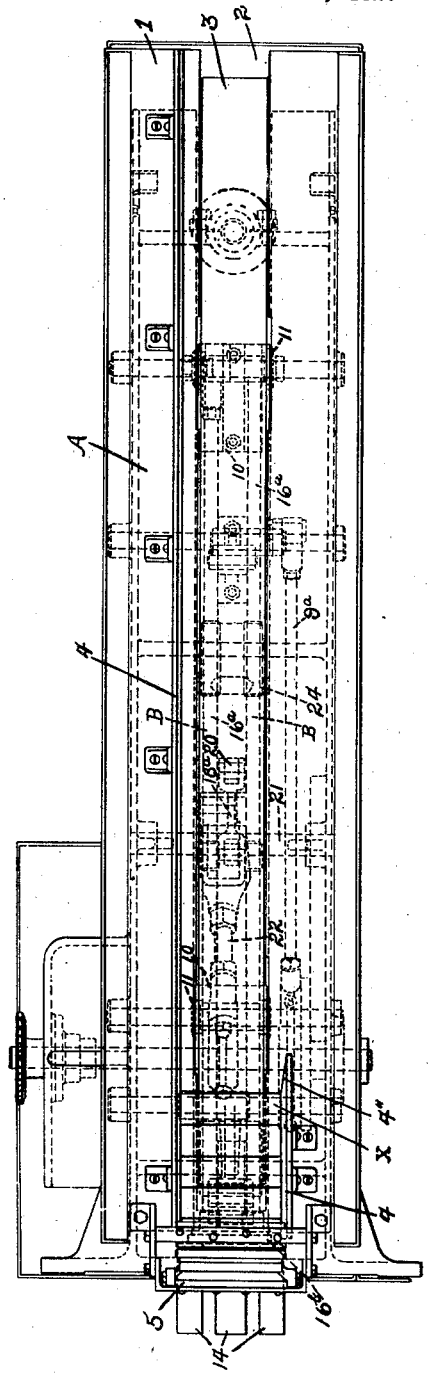
Figure 22:
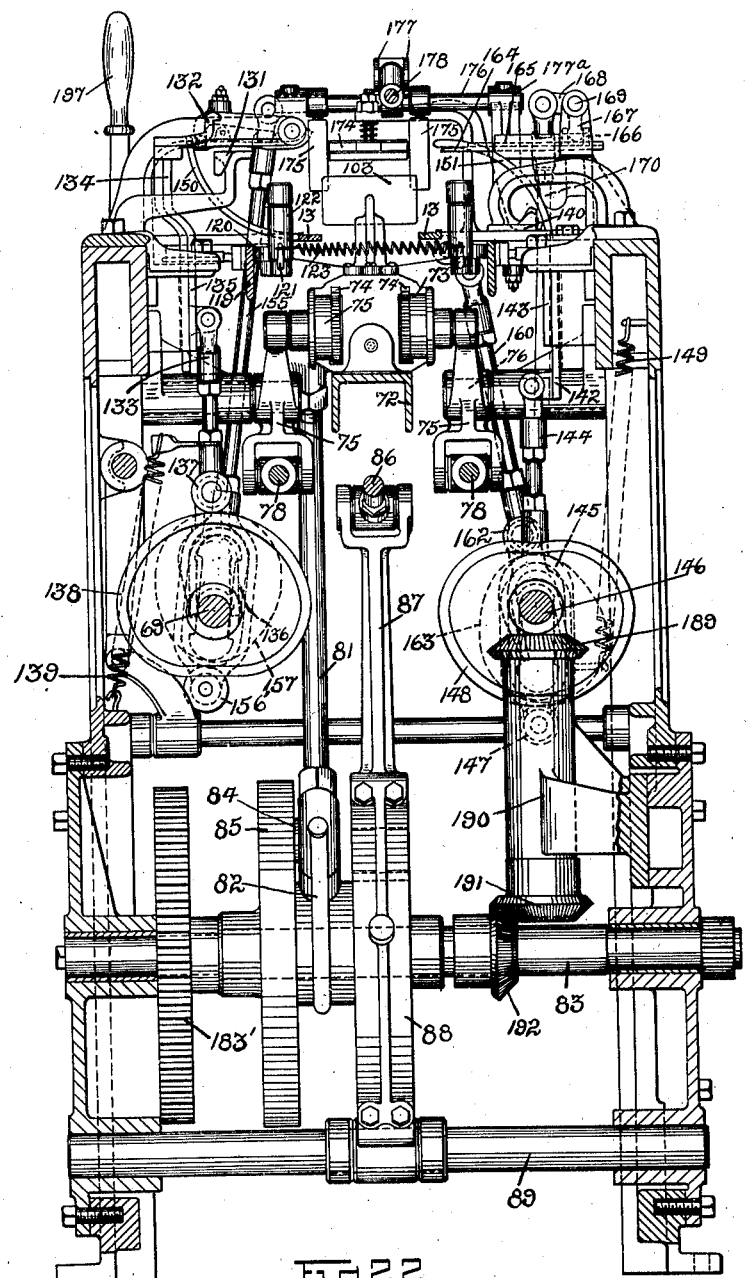

Figure 1 is a side elevation of a portion of a package wrapping machine. Fig. 2 is a top plan view of the primary feeder. Fig. 3 is a side elevation of the mechanism shown in Fig. 2. Fig. 4 is an enlarged detail section of the receiver. Fig. 5 is an end elevation of the primary feeder showing the mechanism for operating the same. Fig. 6 is a side elevat'on of the plunger or ram. Fig. 7 is a side elevation of a portion of the ram showing one step in the wrapping of a butter bar. Fig. 8 is a top plan view of another portion of the mechanism for wrapping each bar. Fig. 9 is a side elevation of a portion of the mechanism shown in Fig. 8 showing the connection for operating the folding plungers. Fig. 10 is a plan view of one of the folding pressure feet. Fig. 11 is a side elevation of the folding guides. Fig. 12 is a top view showing the operation of the folding plunger. Fig. 13 is a side elevation showing the folding operation of the kicker paddle. Fig. 14 is a side view showing the finger for folding the upper flap of a wrapping sheet. Fig. 15 is a top plan view of the stacking housing. Fig. 16 is a side elevation of the housing shown in Fig. 15. Fig. 17 is a section on the line 17—17 of Fig. 16. Fig. 18 is a side elevation of a portion of the machine in advance of the wrapper feeding mechanism. Fig. 19 is a top plan view of the machine shown in Fig. 18. Fig. 20 is an enlarged detail of one of the folding fingers. Fig. 21 is an end elevation of the machine viewed from the left of Fig. 18. Fig. 22 is a vertical sectional elevation taken on the lines 22—22 of Figs. 18 and 19. Fig. 23 is a diagrammatic side elevation showing successive operations performed by the machine. Fig. 24 is a diagrammatic side elevation showing the position of part of the mechanism immediately prior to the stacking operation. Fig. 25 is a diagrammatic side elevation showing the manner of stacking the units. Fig. 26 is a transverse section taken on the line 26—26 of Figs. 18 and 20. Fig. 27 is a view similar to Fig. 26 showing the operation of the mechanism. Fig. 28 is a transverse section on the lines 28—28 of Figs. 18 and 19. Fig. 29 is a view similar to Fig. 28 showing the operation of the mechanism, and Fig. 30 is a plan view of a blank from which a carton is formed.

The embodiment of the invention, shown for purposes of illustration, comprises a package wrapping machine which is particularly adapted to wrap individual units of butter, oleomargarine and the like, the units being in the form of elongate rectangular bars of one-quarter pound size, and after wrapping each unit to stack a predetermined number of units to form a symmetrical pile which is thereafter packaged in a carton. In general, the machine consists of feeding mechanism A, which is adapted to feed individual butter bars or units X to a receiver which is automatically moved to a position where a plunger mechanism B is operable to force each unit from the receiver to a position where a kicker C engages it and moves it along a guide. During the movement of the plunger B, relatively thin and flexible sheet material is fed in the path of movement, and by a suitable mechanism hereinafter described the units are individually wrapped. After the kicker C has advanced a predetermined number, four in this instance, along the guide, stacking mechanism D is operable to stack these units to form a substantially symmetrical pile and advance the pile a predetermined distance. Associated with the stacking mechanism D and connected conjointly to be operated therewith is advancing mechanism E which progressively advances the piles along the guide, and while thus being advanced each pile or stack is packaged in an individual carton, the ends of which are folded in so that liability of the contents being displaced is eliminated.

Referring more particularly to the drawings, the primary feeder or conveyor A for individually feeding the bars X to the receiver is similar in construction and operation to that shown and described in our co-pending application Serial No. 676,231, filed November 22, 1923, for package wrapping machine, and a general description thereof is deemed sufficient here. As most clearly indicated in Figs. 2 and 3, the butter bars are placed on a horizontal table 1 having a longitudinal opening or slot 2 which extends the entire length thereof, and arranged in the slot 2 is a feed bar 3 which is contemporaneously moved vertically and horizontally relatively to table 1.

An adjustable guide 4, parallel with slot 2, extends substantially the entire length of the table. The butter bars are placed in succession on the receiving end of the table across slot 2 and abutting guide 4, so that they are in substantial alignment. By imparting the above-described movement to the feed bar 3, the butter bars are moved progressively along the table until the foremost bar engages a stop 5 mounted at one end thereof, which stop serves to arrest the movement of this bar in properly aligned position with the receiver above mentiond. At the delivery end of table 1 an adjustable guide 4' is provided on the opposite side of slot 2 from guide 4. Guide 4' is substantially parallel with guide 4, but has a beveled end 4'', and insures the delivery of the butter bars in proper position.

For concomitantly imparting limited horizontal and vertical movements to the feed bar 3, a guide 6 is secured to the undersurface of the feed bar intermediate its ends, and a roller on one end of a rocker arm 7 extends into a vertical slot in the guide 6, the arm being oscillatable about a fixed pivot 8, and a rod $9^a$ connects the rocker arm 7 with a cam $9^b$ fast on the shaft 9, the arm 7 thus horizontally reciprocating the feed bar 3. For moving the feed bar 3 slightly above the plane of the table 1 while the latter is being moved horizontally, blocks 10 are secured to the undersurface of the feed bar and are intermittently engaged by rollers 11 carried by rocker arms 12 which are suitably connected to a cam $12^a$ on the shaft 9.

The butter bars X, which are progressively advanced over the table 1, are successively lowered therefrom to a supporting guide or track 13, which extends forward from table 1 substantially the entire length of the machine, except at the points where the wrapper sheets W and cartons Y are fed into wrapping position, as hereinafter described. For this purpose a receiver 14 is moved vertically into alignment with the table 1 to receive an individual butter bar and is thereafter lowered into alignment with the guide 13. Mounted on the receiver 14 is a stop 15 which arrests the advance of the butter bars along the table 1 when the receiver is in its lowered position. For vertically moving the receiver 14, a slide 16 is movable vertically in a guideway 17, and a rocker arm 18 is connected by a rod 19 to a cam $19^b$ on the shaft 9 in such a manner that rotation of the shaft 9 lowers and raises the receiver 14.

Operating in timed relation to the receiver 14 is a plunger $16^a$ having a head $16^b$, preferably of maple, which engages each butter bar X and shoves it from the receiver a predetermined distance along the guide 13. For reciprocating the plunger $16^a$ a link $18^a$ is pivoted to an ear $19^a$ fast to the plunger rod and a lever 20 pivoted to the opposite end of the link $18^a$ pivotally engages a rod 21 fast to the lower part of the machine frame. Pivoted to an ear on the lever 20 adjacent the rod 21 is a rod 22 which engages at its opposite end an eccentric 23 fast on the rotatable shaft 9. Thus, by guiding the plunger rod $16^a$ in suitable bearings 24 secured to cross member $24^a$ beneath table 1, rotation of the shaft 9 reciprocates the plunger head $16^b$ over receiver 14 and the end of guide 13.

In the path of the movement of the plunger head $16^b$ and butter bar X, wrapping sheets W of suitable size are fed one at a time by a suitable mechanism 25 (Fig. 1), which may be driven by a chain $26^a$ engaging a sprocket wheel fixed to a shaft 26 which extends transversely of the machine frame. The mechanism 25 may be similar to that shown and described in our above-mentioned co-pending application, and is operable to cut sheets of a predetermined size from a roll of the material, the material being preferably relatively thin and flexible, such as tissue paper, and drop them in the path of the advancing butter bars. As indicated in Fig. 9, a single sheet W is fed from the feeding mechanism 25 into the path of movement of the butter bar X and is held in a substantially vertical position by movable guide fingers 27 and stationary guides 28, portions of the sheet extending above and below the guide 13 and the lower edge resting against a stop 28$^a$ in the form of a substantially L-shaped lever providing a handle 29. Normally, the stop 28$^a$ is yieldingly held by a suitable spring 29$^a$ in the position shown in Fig. 9. When, however, for some reason it is desired to remove a sheet W from the machine, the handle 29 may be rotated in a clockwise direction so that a sheet W will drop from the machine.

As each butter bar X is progressively advanced along the guide 13, it engages a sheet W, midway between the top and bottom edges thereof, and carries the sheet with it in its further advance, the sheet being folded over the bottom and top of the butter bar by the guide 13 and the top guide plates 30. In the further advance of the butter bar X and sheet W, the sides of the sheet engage yielding pressure feet 31, which fold them rearwardly, as indicated in Fig. 10, against the ends of the butter bar. The portions of the sheet projecting above the presser feet 31 are engaged by curved guides 32 which fold them down against the portions folded by feet 31, while curved guides 33 engage the portions of the sheet projecting below the feet 31 and fold them up against the portions folded by guides 32. The guides 32 are formed on the top guide plates 30 by bending the material in the desired manner, while the guides 33 are formed on the main guide 13 which extends horizontally of the machine. As indicated in Fig. 8, the top guide 30 is formed in two plates, each plate having ears 34 through which a rod 35 extends. Ears 36 are also fixed to the forward portion of the plates 30 to receive a rod 37, and springs 38 surround the rod 37 between the ears 36 and collars 39 fixed to the rod 37 so that as a butter bar X is progressively advanced along the main guide track 13 the plates 30 are enabled to yield laterally, during the folding operation of the wrapper W, and so operate correctly with butter bars of slightly different lengths.

The butter bar X and wrapper W are advanced along the guide 13 a slight distance beyond the folding guides 32 and 33 by the plunger 16$^a$ to point F where oppositely positioned folding plungers 40 are reciprocated to fold a portion of the wrapper sheet W inwardly against the sides of the butter bar (Fig. 12). For conjointly operating the folding plungers 40, bell cranks 41 are pivoted to the outer ends of the plungers 40 and to supports 42, which depend from the frame of the machine, the opposite ends of the bell cranks being pivoted to a rod 43, which has a forked end 44 straddling the transversely extending rotatable shaft 26. Fixed to the shaft 26 is a cam 45 which coacts with a roller 46 carried by the rod 43, the roller being held in operative relation to the cam by a coiled spring 47, which is connected to the rod 43 at one end and to a stationary rod 48 at the opposite end.

Further advancement of the wrapped butter bars X is accomplished by means of a kicker or paddle 49 which engages each butter bar X after the folding plungers 40 have been retracted. Kicker 49 and plunger 16$^a$ are operated in such timed relation that kicker 49 is in the position in which it is shown in dotted lines in Fig. 6 when plunger 16$^a$ is in its full-line position, as shown in that figure, and plunger 16$^a$ is in the position in which it is shown in dotted lines in Fig. 6 and full lines in Fig. 23 when kicker 49 is in its full-line position, as shown in Fig. 23. The kicker is operated in such a manner that its upper edge travels through the path indicated in dotted lines in Figs. 23, 24 and 25, and, as it rises to its position shown in Figs. 13 and 25, folds upward the lower rear flap of wrapper W. The butter bars are thus advanced along the supporting guide or track 13 through a housing having a spring-pressed top plate 49$^a$ and spring-pressed side plate 49$^b$, thereby holding the bars in proper position during advancement to position F.

For actuating the kicker 49 to describe the path of movement above-mentioned, a rod 50 is pivoted to the bottom of the kicker and extends through a guide 51; a roller 52 being carried on the lower end of the rod 50 and engaging a cam 53 fixed to the shaft 26. Formed on the lower end of the guide 51 is a strap 54, in which is disposed an eccentric 55 which is secured to the shaft 26, the strap 54 being pivoted to the rod 48 at its lower end. For holding the roller 52 in operative relation to the cam 53 coil springs 60 are connected at one end to a rod 61 secured to the rod 50, the rod 61 being movable in a slot in the guide 51, and at the opposite end to a rod 62 which is secured to the strap 54. Also pivoted to the kicker 49, but at a point in rear of the rod 50, is a rod 56 having a forked end 57 straddling the shaft 26 and carrying a roller 58 engaging a cam 59 rotatable with the shaft 26.

After the kicker 49 has advanced a butter bar along the guide 13 to position F', a plate 63 having fingers is moved to engage the projecting top rear flap of the wrapper W and fold it downward against the side of the butter bar, thus completing the wrapping of each individual bar (Fig. 14). For actuating the plate 63 a rod 64 is pivoted at one end to the upper portion of the plate and at the other end is secured to a shaft 65 which is supported in a bracket 66 mounted on the machine frame, the rod 64$^a$ being pivoted to the plate above the rod 64 and to a lug 64$^b$ fixed to the bracket 66. Also secured to the shaft 65 is an arm 67 to which a depending rod 68 is pivoted, the rod 68 being reciprocated by a suitable cam, which is secured to a shaft 26 extending transversely of the machine frame.

As indicated in Fig. 24, the kicker 49 successively feeds four wrapped butter bars X to the stacking housing 91, the finger 63 being actuated to fold the remaining unfolded flap against the side of each bar, and as the bars are advanced the closed side of the next succeeding bar abutting against the folds of the advanced bar prevents unfolding of the wrapper. Thereafter a part of the stacking and advancing mechanism E engages the last two bars of the row of the four and superposes them upon the advanced two, thereby forming a substantially symmetrical pile or stack containing four quarter-pound wrapped butter bars, and then advances the stack a predetermined distance.

The stacker comprises a paddle 70 having a shelf 71, the paddle being secured to a feed frame 72 which is moved to describe a path indicated by the dotted lines at the left of Fig. 24. Starting with paddle 70 in the position in which it is shown in Fig. 24, it is first raised to the position shown in Fig. 25, so that shelf 71 raises the rear two butter bars, then it is moved horizontally forward to the position in which it is shown in Fig. 23, after which it is moved horizontally rearward until shelf 71 is withdrawn from between the butter bars, then slantingly downward and rearward until it is low enough to pass beneath the next row of four butter bars, and finally horizontally rearward to the position in which it is shown in Fig. 24.

For imparting the above-described movement to the feed frame 72, toothed rollers 73 are adapted to rotate along guide racks 74 formed in the frame 72, and bell cranks 75 carrying the rollers 73 are rocked on fixed pivots 76, the opposite ends of the bell cranks being pivoted to a horizontally extending rod 78 which is pivoted at its opposite end to a bell crank 79 having a fixed pivot 80. To the opposite end of the bell crank 79 is pivoted a rod 81 which has a strap 82 at its opposite end, through which strap extends a transverse shaft 83. Carried by the rod 81 is a roller 84 coacting with a cam 85 which is secured to the shaft 83 so that rotation of the cam 85 lowers and raises the feed frame 72 as indicated. For contemporaneously moving the feed frame horizontally, a rod 86 is pivoted at one end to the lower part of the frame approximately midway between the ends thereof and at the opposite end to an arm 87 provided with a strap 88 at its lower end, which is pivoted to a rod 89 supported at its opposite ends in the machine frame. Fixed to the shaft 83 and rotatable in the strap 88 is an eccentric 90. Thus by rotating the shaft 83 the feed frame 72 is moved with its supported parts through the path described above in connection with paddle 70. The feed frame is connected by means described below, to be driven at one-fourth the speed of the plunger 16$^a$ and kicker 49 so that four butter bars are advanced along the guide track 13 before the paddle 70 commences the stacking operation.

To prevent displacement of the bars from the shelf 71 during the stacking operation spring-pressed plates 92 yieldingly engage the upper surface of the butter bars on the shelf. After passing the spring-pressed plates 92, the butter bars are advanced under a spring-pressed top plate 93, which holds the bars on the shelf when moving through the housing. For insuring the proper position of the rear butter bar of the advanced pair during stacking, lips 94 are secured to the side of the stacking housing 91 and project over the top of this bar so that liability of displacement of this bar when the rear pair are being carried to stacking position is prevented. After stacking the bars as above described, the paddle 70 advances the stack to the forward end of the stacking housing past the spring plates 94$^a$ which snap inwardly when the stack passes thereover so that retrograde movement of the stack is prevented when the stacking paddle is retracted. To prevent tilting of the stack while in this latter position, a spring 95 engages the top of the stack.

The operation of the paddle 70 is most clearly indicated in Figs. 23, 24 and 25. Fig. 24 shows the paddle beneath the position F about to be elevated to engage the two rear butter bars, the kicker 49 having advanced four butter bars to form a continuous row in stacking position. After elevating the two rear bars, as shown in Fig. 25, the shelf 71 moves over the two forward bars and the paddle 70 then acts to advance the four stacked bars to the position G, Fig. 23, in the region of the carton feeding mechanism 96. This mechanism has a chain and sprocket connection 97 with a transverse drive shaft 98. A chain and sprocket connection 99 from a shaft 194, described later, drives the kicker shaft 26, the latter having similar connection 99$^a$ with the shaft 9, which drives the primary feeding mechanism A and plunger 16$^a$ (Fig. 1). The carton feeding mechanism 96 is of any well-known form and adapted to intermittently feed cartons Y down between stationary fingers 100 and 101 into the path of the advancing stack (Fig. 23).

The cartons Y are of the usual form, being provided with a central panel $a$, a top panel $b$ having an edge flap $c$ at its outer edge, and a bottom panel $d$ with a side panel $e$ attached to its outer edge. The side panel $e$ has the opposite end flaps $f$ and $g$, the panel $d$ has an outer end closing flap $h$ at its right end, and the panel $b$ has a closing flap $j$ at its left end. The flap $c$ has a tab $k$ at its right end, and the central panel $a$ has the side flaps $l$ and $m$. Each closing flap $h$ and $j$ is provided at its outer end with an inserting lip $h'$ and $j'$, respectively.

The remaining operation of the machine consists in progressively advancing each stack, and, while advancing, packaging the stack in a carton so that as delivered from the machine the four butter bars are not only individually wrapped with relatively thin and flexible sheet material but are also neatly packed in a carton of heavier material which insures against damage to the bars and prevents access of dirt and other extraneous matter. For progressively advancing a stack along the guide 13, paddles 102, 103, 104, and 105 are fixed in proper spaced relationship to the feed frame 72 to which the stacking paddle 70 is secured, each paddle engaging the stack at a predetermined point of travel and moving the stack through the carton folding mechanism hereinafter described.

In the next advancing movement of the feed frame 72, after the wrapped butter bars have been stacked and moved to a position in rear of the carton feeding mechanism, the paddle 102 advances the stack over the guide track 13, engaging a carton positioned in its path of movement and thereafter advancing the carton and stack to the position H (Fig. 23). During this movement the top and bottom of the carton are folded over the stack by the engagement of a portion of the carton with the guide 13 at the lower side and with stationary guide 106ª on the upper side, the upper side of the carton being held down during its movement in advance of guide 106ª by horizontally disposed folding wings 106 at the top. After the stack and carton have been advanced slightly beyond the folding wings 106, paddle 102 is moved horizontally rearward until it is back of flap $e$, while paddle 70 is moved to withdraw shelf 71 from between the butter bars of the succeeding stack. As soon as paddle 102 is out of the way, wings 106 are swung downwardly to fold the flap $c$ against the rear side of the stack. For holding the stack in position while the folding wings 106 are operated, holding wings or gates 107 engage the front of the stack, the top panel $b$ of the carton being engaged by a spring-pressed plate 108 supported by a bracket 109.

The folding wings 106 are fast to a rod 110 which is rotatably supported in the bracket 109, and pivoted to a lug fixed to the rod 110 is a depending rod 111 having a strap 112 at its lower end surrounding a longitudinal shaft 69, a roller 113 on the strap coacting with a cam 114 on the shaft. It will thus be apparent that rotation of the cam 114 actuates the folding wings 106 to fold the flap $c$, these wings being operated in proper timed relation with the advance of each stack. The holding wings 107 are similarly connected to be operated from the shaft 69, these wings being fast to a rod 115 to which is operatively connected a depending rod 116 having a strap 117 surrounding the shaft 69 and carrying a roller 118 coacting with a cam 119.

For holding the flap $c$ in folded position against the side of the stack after wings 106 are swung up until flap $e$ is raised enough to hold it, a finger 127, pivoted intermediate its ends to the bracket 109, is adapted to be actuated by a depending rod 128 operatively connected to a cam on a longitudinal shaft 146.

From the position H the stack and carton are advanced, in the next succeeding movement of the feed frame 72, by the paddle 103 to the position J, during which movement the flap $e$ of the carton is folded upwardly against the stack by the engagement of this paddle, and the side flaps $f$, $g$ and $k$, and $l$ and $m$ are successively folded against the ends of the stack. For folding the end flaps $f$, $g$ and $k$ inwardly diverging tracks or cams 119 are secured to the machine frame on opposite sides of the guide track 13, and rollers 120 are adapted to roll along the cams 119, the rollers having arms 121 integral with sleeves 122, and the opposite ends of the arms 121 extend to the opposite side of the sleeve and are urged toward each other by a coiled spring 123 connected thereto. The sleeves 122 are rotatable on upright rods 124 secured together by a rod 125, which is fixed to the paddle 103. Integral with the sleeves 122 are folding fingers 126, so that by this arrangement during the advancing movement of the paddle 103, the rollers 120 are forced inwardly by the cams 119 and rotate the sleeves 122 to move the fingers 126 inwardly, thereby engaging the side flaps $f$, $g$ and $k$ and folding them inwardly over the ends of the stack. During this advance of the stack and carton, the front end flaps $l$ and $m$ engage the curved guides 129, which fold these flaps over the flaps $g$ and $f$, respectively. A slight yielding pressure is exerted on the top of the carton and stack while advancing by means of a spring-pressed plate 130 (Fig. 18), which insures against movement of the carton and stack from the working plane. The paddle 103 delivers the carton and stack to the lip breaking or forming mechanism (Figs. 26 and 27) where a portion of the end closing flaps *h* and *j* are folded at substantially right angles in opposite directions to form lips *j'* and *h'*.

For forming the lip *j'* an anvil 131 is arranged in such a position that the flap *j* rests thereon and a hammer 132 is connected to be moved downwardly against the anvil 131, thereby folding the portion of the flap *j* projecting beyond the anvil, as indicated in Fig. 27. For actuating the hammer 132 a rod 133 is pivoted to a rod 134 carrying the hammer, the rod 134 being slidable in a guide 135. The rod 133 is provided with a strap 136 at its lower end surrounding the longitudinal shaft 69 and carries a roller 137 which coacts with a cam 138 fast to the shaft 69, a coiled spring 139 fastened to the rod 133 at one end and to the machine frame at the opposite end holding the roller 137 in operative position relative to the cam. By means of this arrangement, the cam raises the hammer 132, and the coiled spring 139 forces the hammer into yielding engagement with the anvil 131, thus folding the lip *j'* downwardly.

For folding the lip *h'* the above described operation is reversed and an anvil 140 is arranged in such a manner that the flap *h* is positioned thereunder with a portion of the flap projecting outwardly beyond the anvil. The hammer 141 cooperates with the anvil and is carried by a rod 142 sliding vertically in a guide 143, a rod 144 being pivoted to the slide 142 and having a strap 145 at the lower end thereof surrounding the longitudinal shaft 146 and carrying a roller 147 held in engagement with a cam 148 by a coiled spring 149. The arrangement of the parts is such that the cam 148 lowers the hammer 141, and the coiled spring 149 actuates the hammer 141 into yielding engagement with the anvil 140.

During the next succeeding advancing movement of the feed frame 72 the relatively short paddle 104 engages a stack and carton and advances them to the position K (Fig. 23), where the lips *h'* and *j'* are forced inside the carton, thus completing the folding of the carton about the stack. For accomplishing this, oppositely curved tracks or guides 150 and 151 are secured to the machine frame on opposite sides of the guide track 13, the guide 150 serving to guide the lip *j'* and the upwardly curved guide 151 guiding the lip *h'*. For moving the flap *j* along the guide 150, a plate 152 is pivoted to a bracket 153 secured to the machine frame, and a spring device 154 is carried by the plate 152 yieldably to engage the flap *j*. In order to move the plate 152 into engagement with the flap *j*, a rod 155 is pivoted to a lug 156 fixed to the plate and provided on the lower end of the rod 155 is a strap carrying a roller 156 coacting with a cam 157 fixed to the longitudinal shaft 69. It will be apparent that by rotation of the cam 157 the plate 152 is moved downwardly engaging the flap *j* and forcing the lip *j'* inside the package.

In a similar manner a plate 158, also having a spring device 159, is connected to be moved along the guide 151 to insert the lip *h'* into the package and for operating the plate 158 a rod 160 is pivoted to a lug fixed to the plate, and the lower end of the rod 160 is provided with a strap surrounding the shaft 146 which strap carries a roller 162 coacting with a cam 163 fast to the shaft 146. By means of this connection, rotation of the cam 163 actuates the plate 158 relatively to the carton and stack along the guide 151, thus moving the flap *h* toward the stack.

In order to insure the insertion of the lip *h'* inside the package, a pointed finger 164 is adapted to be inserted inside the carton between the stack and the upper wall of the carton so that when the lip *h* is moved by the plate 158 toward the stack the finger 164 serves as a guide, thus insuring against liability of the lip extending outside the carton. The finger 164 is slidable in a guide 165 and is provided with a pair of ears 166, between which is disposed an arm 167 of a bell crank 168 which is pivoted at 169, and pivoted to the other arm of the bell crank is a depending rod 170 having a strap 171 at its lower end which surrounds the shaft 146 and carries a roller 172 coacting with a cam 173. Thus, by rotating the cam 173 the finger 164 is moved transversely relative to the guide 13, this movement being timed with relation to the movement of the plate 158 so that the finger is inserted into the package immediately preceding the approach of the plate 158. Exerting a yielding pressure on top of the carton and stack during this operation is a spring-pressed plate 174 which assists in holding the package in position while the lips are being forced inside the package.

To prevent forward movement of the carton and stack during this operation, holding fingers or gates 175 engage the forward end of the package, these fingers being fixed to a transverse rod 176 supported by a bracket 177ª mounted on the machine frame. Pivoted to ears 177 on the rod 176 is a rod 178 which extends rearwardly of the machine and is pivoted to an arm 179 fast on the rod 115 which carries the folding wings or gate 107. It will thus be observed that the two sets of holding wings or gates 175 and 107 are connected conjointly to be operated from the shaft 69.

During the next advancing movement of the feed frame 72 the relatively long paddle 105 engages the packaged stack and forces it from the machine along the guide 13 and under a spring-pressed plate 180, the guide 13 extending to any suitable place where the packages may be packed in boxes for shipment.

For driving the mechanism above-described, a drive pulley 181, which may be driven by an electric motor, is fixed to a shaft 182 mounted in the lower part of the machine frame, and this shaft is connected by a gear train 183 (Fig. 18) to shaft 83, which is geared to stub shaft 98 from which the kicker mechanism is driven, as above described. The final gear of train 183 is a large gear 183' on shaft 83. Gear 183' meshes with a gear 194' on shaft 194 and drives said shaft 194, and through it shafts 26 and 9, at four times the speed of shaft 83. As indicated in Figs. 18, 21 and 22, the shafts 146 and 69 are provided with gears 186 and 187, respectively, which are interconnected by an idler gear 188, and the shaft 146 has a beveled gear 184 meshing with a beveled gear 189 fixed to a vertical shaft which is supported by a bracket 190. To the opposite end of the vertical shaft is secured a beveled gear 191 meshing with another beveled gear 192 on the shaft 83 which, as above mentioned, is geared to the drive shaft 182. The machine may be manually operated by a hand wheel 193 mounted on shaft 194. For controlling the operation of the machine an operating lever 197 is connected to operate a clutch 198 which slides longitudinally on the shaft 182.

An outstanding characteristic of the invention consists in the stacking of a number of articles which may be previously wrapped. This enables a stack which may be of symmetrical form to be automatically packaged in a carton in a comparatively simple manner, such for example as by the machine described. A machine of this character will not only wrap a great number of individual articles within a short period of time but will also package a predetermined (preferably divisible) number of such articles, thus contributing to labor saving and increasing production. Another feature of the invention is the unique means for transferring each article from the primary feeding mechanism to the stacking mechanism which is so constructed and operated as not to injure or distort articles of a relatively soft or semi-plastic material, and is also adapted to advance a predetermined number before the stacking mechanism is brought into operation.

Although I have shown and described a machine for individually wrapping bars of butter, stacking bars in a suitable manner and thereafter packaging the stacks, it is to be understood that the invention is not limited to the wrapping and packaging of butter bars because it is well adapted for use in other connections and for wrapping other articles whether of semi-plastic material or not. It is further to be understood that numerous changes in details of construction and arrangement may be effected without departing from the spirit of the invention, especially as defined by the claims.

Having thus described my invention, what I claim as new and desire to secure by Letters Patent, is:—

1. In a machine of the class described, means to advance a plurality of articles to form a row, and mechanism operable to engage and carry a predetermined number of said articles to the remaining articles of the row to form a stack.

2. In a machine of the class described, means to form a row having a predetermined number of articles, and means to form a stack from a divisible number of said articles.

3. In a machine for packing articles, means to form a row having a divisible number of articles, and means to move said articles relatively to each other to form a stack.

4. In a machine for packing articles, means to form a row having a divisible number of articles of substantially similar size and shape, and means to move said articles relatively to each other to form a symmetrical stack.

5. In a machine for packing articles, means to advance a number of wrapped articles to form a row, and means to superpose a portion of said number upon the remainder to form a stack.

6. In a machine for packing articles, means to advance a divisible number of wrapped articles along a guide to form a row, and means to superpose a portion of said articles upon an equal portion thereby to form substantially a symmetrical stack.

7. In a machine for packing articles, means to receive a row of wrapped articles, and means to move a predetermined number of said articles relatively to the remainder to form a stack.

8. In a machine for packing articles, a means to receive a row of wrapped articles of similar shape and size, and means operable to deposit a predetermined number of said articles upon the remainder to form a stack.

9. In a machine for packing articles, articles feeding means, a guide to receive said articles, a series of means for advancing said articles along said guide, and means operable when a predetermined number of articles have been advanced for carrying certain articles from their plane of rest toward the remainder and associating them therewith to form a stack.

10. In a machine for packing articles, a guide means for feeding articles individually to said guide, a series of means successively to advance individual articles along said guide, and means operable when a predetermined number of articles have been advanced for carrying certain of said articles from their plane of rest toward the remainder and associating them therewith to form a stack.

11. In a machine for packing articles, a guide, means for advancing articles along said guide, and means operable when a predetermined number of articles have been advanced for transferring a portion of said number toward the remainder and associating them therewith to form a stack.

12. In a machine for packing articles, a guide, means for advancing articles along said guide, and means operable when a predetermined number of articles have been advanced for transferring a portion of said number toward the remainder and associating them therewith to form a stack, said last means being operated at a speed of the order of one fourth that of said first means.

13. In a machine for wrapping articles, a guide to receive a row of articles of similar shape and size, and means to transfer a number of said articles toward the remainder and associate them therewith to form a stack, said means being operable to advance the stack so formed a predetermined distance along said guide.

14. In a machine for wrapping articles, a guide to receive a continuous row of wrapped articles, and means to move a divisible number of said articles relatively to each other to form a stack, said means being also operable to move said stack a predetermined distance.

15. In a machine for wrapping articles, a guide, means to feed articles to said guide to form a row, means to superpose a predetermined number of said articles upon an equal number of adjacent articles to form a stack, said means being operable to advance said stack along said guide, and means engaging said stack at the end of the travel imparted by said means to hold said stack in position.

16. In a machine for packing articles, a track to receive a row of articles, a feed frame having a series of members intermittently engageable with said articles for advancing the latter along said track, one of said members being operable automatically to move a predetermined number of said articles relatively to the remainder to form a stack.

17. In a machine for packing articles, a track to receive a row of articles, a feed frame having means for superposing a predetermined number of said articles upon the remainder to form a stack and thereafter advancing the stack, and means for imparting first an upward and then a forward movement to said frame during the advancing movement thereof, and thereafter imparting a downward and then a rearward movement during the retracting movement thereof.

18. In a machine for packing articles, means to receive a row of wrapped articles, means to move a predetermined number of said articles relatively to the remainder to form a stack, and means engaging said remainder for preventing movement thereof while stacking.

19. In a machine for packing articles, means to receive a divisible number of wrapped articles of similar shape and size, means to carry one half of said number and superpose them upon the other half thereby to form a stack, and means yieldingly engaging the advanced half to prevent movement thereof while stacking.

20. In a machine for packing articles, means to receive a plurality of wrapped articles, a member operable to carry a number of said articles and superpose them upon an equal number of juxtaposed articles to form a stack, means for yieldingly holding said last articles when said other articles are conveyed, and means to engage said stacked articles to prevent displacement thereof when said carrying member is retracted.

21. In a machine for packing articles, means to receive a plurality of wrapped articles, a member operable to carry a number of said articles and superpose them upon an equal number of juxtaposed articles to form a stack, means including a yieldable member for preventing displacement of said last articles, means to engage said superposed articles to prevent displacement thereof when said carrying member is retracted, means for advancing said stack, and yieldable means at the top and sides to hold the contents of the stack in position during advancement.

22. In a machine of the class described, a paddle having a vertical face, and a horizontally disposed shelf on said face.

23. In a machine of the class described, a paddle having a vertical face, and a horizontally disposed shelf on said face between the top and bottom edges thereof.

In testimony whereof we have hereunto signed our names to this specification.

JOHN P. ALDRICH.
HOWARD A. MORRIS.